(12) United States Patent
Chinazzo et al.

(10) Patent No.: US 11,284,480 B2
(45) Date of Patent: Mar. 22, 2022

(54) SENSOR HOLDING TRAY FIXING

(71) Applicant: WHIRLPOOL CORPORATION, Benton Harbor, MI (US)

(72) Inventors: Fabiano Chinazzo, Cassinetta (IT); Francesca Partegiani, Gavirate (IT)

(73) Assignee: Whirlpool Corporation, Benton Harbor, MI (US)

( * ) Notice: Subject to any disclaimer, the term of this patent is extended or adjusted under 35 U.S.C. 154(b) by 548 days.

(21) Appl. No.: 16/225,490

(22) Filed: Dec. 19, 2018

(65) Prior Publication Data

US 2020/0205239 A1 Jun. 25, 2020

(51) Int. Cl.
*H05B 6/06* (2006.01)
*H05B 6/12* (2006.01)

(52) U.S. Cl.
CPC .......... *H05B 6/062* (2013.01); *H05B 6/1209* (2013.01); *H05B 2213/04* (2013.01); *H05B 2213/07* (2013.01)

(58) Field of Classification Search
CPC .. H05B 6/062; H05B 6/1209; H05B 2213/04; H05B 2213/07; H05B 1/0266; H05B 2213/05; H05B 6/12; H05B 6/06
USPC ....... 219/441, 494, 518, 622, 624, 625, 627, 219/663, 667, 676
See application file for complete search history.

(56) References Cited

U.S. PATENT DOCUMENTS

| | | | |
|---|---|---|---|
| 4,065,802 A | 12/1977 | Mizukawa et al. | |
| 4,351,996 A * | 9/1982 | Kondo | H05B 6/062 219/448.13 |
| 5,448,038 A | 9/1995 | Kim | |
| 2010/0206871 A1 | 8/2010 | Kataoka et al. | |

FOREIGN PATENT DOCUMENTS

| | | |
|---|---|---|
| CN | 2585081 Y | 11/2003 |
| CN | 201434427 Y | 3/2010 |
| CN | 102455007 A | 5/2012 |
| CN | 202420708 U | 9/2012 |
| EP | 2626638 A1 | 8/2013 |
| FR | 3006425 A1 | 12/2014 |
| FR | 2968885 B1 | 10/2015 |
| JP | 2007287536 A | 11/2007 |
| JP | 6200275 B2 | 9/2017 |

* cited by examiner

*Primary Examiner* — Phuong T Nguyen
(74) *Attorney, Agent, or Firm* — Price Heneveld LLP

(57) ABSTRACT

A sensor holder apparatus for a cooktop comprises a body forming an exterior profile configured to extend through a portion of a housing of the cooktop and position a sensor proximate to an interior surface of a panel forming a cooking surface. A first interior passage is formed through the body and configured to receive the sensor in a first configuration or type. At least one second interior passage is configured to receive the sensor in a second configuration or type. The sensor holder is configured to retain and position the sensor in the first configuration or the second configuration in conductive connection with a panel forming a cooking surface of the cooktop.

13 Claims, 3 Drawing Sheets

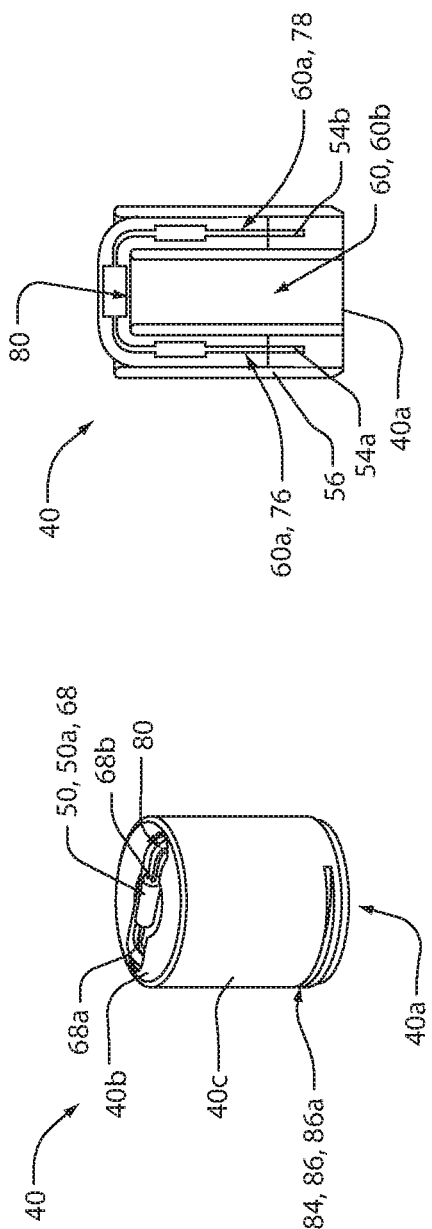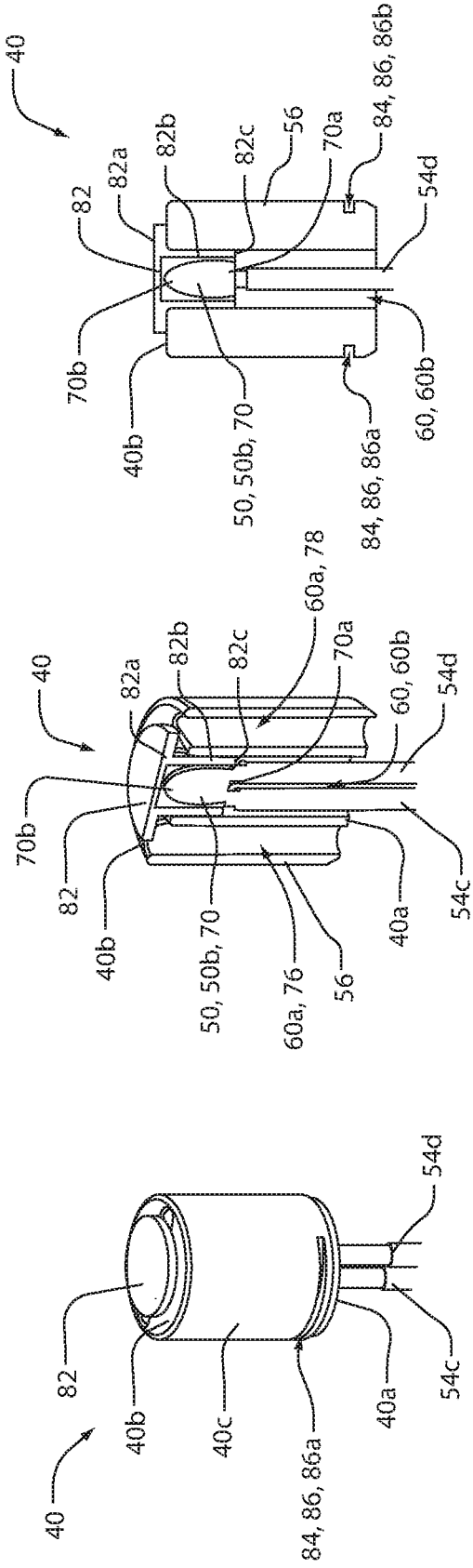

SENSOR HOLDING TRAY FIXING

TECHNOLOGICAL FIELD

The disclosure relates to an apparatus for use with cooktops and, more specifically, relates to a support for a sensor for use with cooktops.

BACKGROUND

Induction cooktops are devices which exploit the phenomenon of induction heating for food cooking purposes. Induction cooktops comprise a top made of glass-ceramic material upon which cooking units are positioned (hereinafter "pans"). Moreover, there are provided inductors comprising coils, which may comprise various forms of metal (e.g. copper, aluminum, CCA—copper clamped aluminum) of copper wire where an oscillating current (e.g. an alternating current) is circulated producing an oscillating electromagnetic field.

The electromagnetic field has the main effect of inducing a parasitic current inside the pan bottom, which is made of an electrically conductive ferromagnetic material. The parasitic current circulating in the pan bottom produces heat by dissipation; such heat is generated only within the pan and it acts without heating the cooktop. This type of flameless cooktop has a better efficiency than electric cooktops (i.e. a greater fraction of the absorbed electric power is converted into heat that heats the pan). In addition, induction cooktops are safer to use due to the absence of hot surfaces or flames, reducing the risk of burns for the user or of fire. The presence of the pan on the cooktop causes the magnetic flux close to the pan itself causing the power to be transferred towards the pan bottom. The greater the size of the pan, the higher the power that can be transferred.

With induction cooktops as well as conventional cooktops, temperature management of various components including the glass or panel forming the cooking surface may be managed to prevent damage. In order to monitor the temperature of such components and/or to prevent oil burns during frying, one or more temperature sensors or temperature probes may be implemented to monitor critical temperatures to maintain efficient operation and prevent malfunction. The disclosure relates to such sensors and apparatuses to effectively implement these sensors to effectively measure the temperature.

SUMMARY

In at least one aspect, a sensor holder apparatus for a cooktop is disclosed. The apparatus comprises a body forming an exterior profile configured to extend through a portion of a housing of the cooktop and position a sensor proximate to an interior surface of a panel forming a cooking surface. A first interior passage is formed through the body and configured to receive the sensor in a first configuration. At least one second interior passage is configured to receive the sensor in a second configuration. The sensor holder is configured to retain and position the sensor in the first configuration or the second configuration in conductive connection with a panel forming a cooking surface of the cooktop.

In at least another aspect, a method for positioning a plurality of temperature sensors in a cooktop housing is disclosed. The method comprises positioning a temperature sensor probe in a housing of the cooktop with a sensor support. The method further comprises connecting the temperature sensor probe via a thermally conductive connection to an interior surface of a panel of a cooking surface and interchangeably supporting the temperature sensor probe in a plurality of configurations. A first configuration forms a single passage through a body of the sensor support and a second configuration forms a looping passage through the body of the sensor support. The looping passage comprises a plurality of electrically isolated passages extending through the body.

In at least another aspect, a sensor holder apparatus for a cooktop is disclosed. The apparatus is configured to position the sensor in conductive connection with a panel forming a cooking surface of the cooktop and comprises a body forming an exterior profile extending between a holder base surface to a holder top surface. A plurality of interior passages extend through the body substantially from the holder base to the top surface. A first interior passage is configured to receive the sensor in a first configuration and at least a second interior passage is configured to receive the sensor in a second configuration. The first configuration and the second configuration comprise different topographies of the sensor.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 4A is a projected view of a sensor support demonstrating a sensor in a first configuration having a first topography;

FIG. 4B is a projected, side cross-sectional view of a sensor support demonstrating a sensor in a first configuration having a first topography;

FIG. 5A is a projected view of a sensor support demonstrating a sensor in a second configuration having a second topography;

FIG. 5B is a projected, side cross-sectional view of a sensor support demonstrating a sensor in a second configuration having a second topography; and FIG. 5C is a side cross-sectional view of the sensor support demonstrated in FIG. 5B along a plane perpendicular to the section plane demonstrated in FIG. 5B.

DETAILED DESCRIPTION OF EMBODIMENTS

Figure 1:
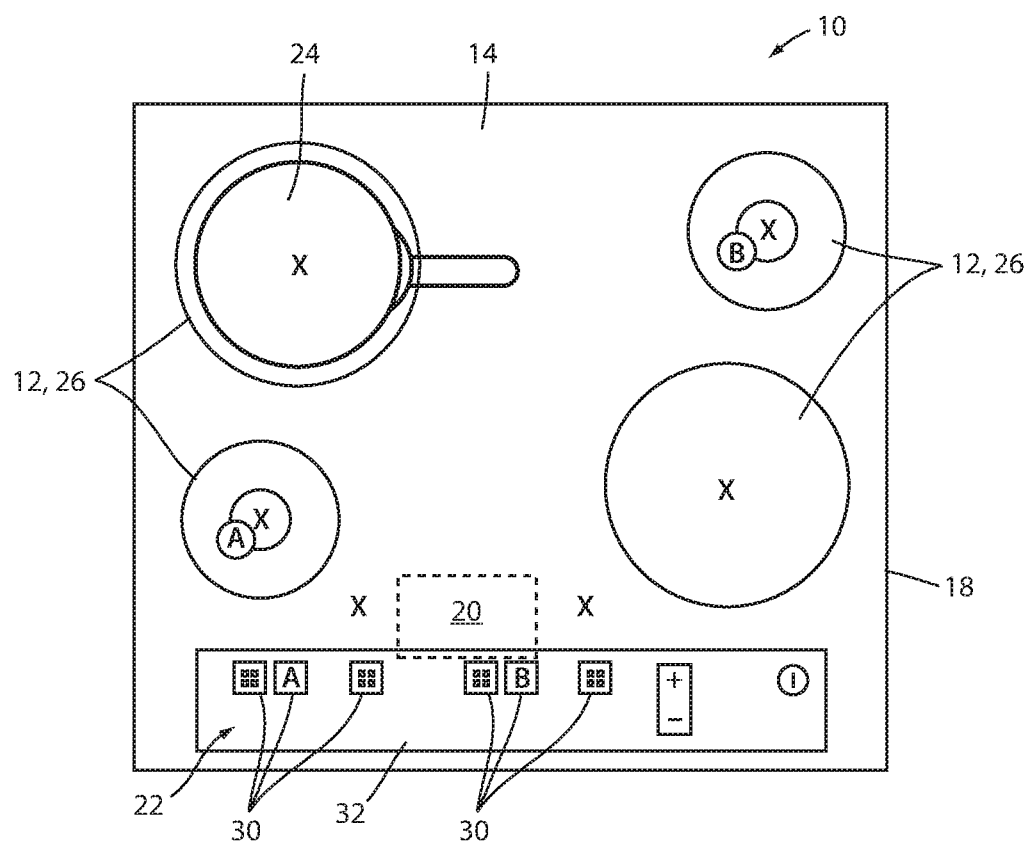
FIG. 1 is a top view of a cooktop according to the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The disclosure provides for a support for a sensor that may be incorporated in a cooktop or stove. In some embodiments, the sensor may correspond to a temperature sensor or probe configured to detect a temperature of a panel forming a cooking surface of the cooktop. The various configurations described herein provide for temperature sensors of two substantially different topographies to be supported by a single, common support as further discussed in reference to FIGS. 4 and 5. In each of the configurations, the support apparatus may be configured to position each of the differing sensors in thermally conductive contact with an interior surface of the panel forming the cooking surface of the cooktop. In an exemplary embodiment, the support is described in reference to an induction cooktop comprising at least one induction coil. In the example, the support is demonstrated positioned within a central opening formed through the induction coil. However, it shall be understood that the support may be utilized in various configuration for cooktops with various heating coil arrangements and in various positions relative to the coils forming the arrangements. Accordingly, the disclosure provides for a novel solution that may be implemented to position and retain sensors for cooktops to suit a variety of applications.

Referring to the embodiment illustrated in FIG. 1, reference numeral 10 generally designates a top view of a cooktop 10. The cooktop 10 may comprise a plurality of cooking hobs 12 oriented on a surface panel 14, which may correspond to a ceramic plate. Beneath the surface panel 14 and corresponding to the hobs 12, a plurality of induction coils may be disposed in a housing 18. The induction coils may be in communication with a controller 20 configured to selectively activate induction coils in response to an input to a user interface 22. The controller 20 may correspond to an automatic control system configured to activate one or more of the induction coils in response to an input or user selection. In this way, the controller 20 may selectively activate each of the hobs 12 to heat a vessel 24, which may be utilized for food preparation or other heating tasks.

As discussed in detail in reference to FIGS. 2-5, the cooktop 10 may comprise one or more temperature sensors (indicated by X), which may be positioned in a variety of locations beneath and in conductive connection with an interior surface of the panel 14. One or more of the temperature sensors may be supported by the sensor support provided by the disclosure. In this way, the disclosure may provide for the cooktop 10 to selectively implement the temperature sensors with differing topographies without necessitating any change to the structural components of the cooktop 10 and the hobs 12.

The user interface 22 may correspond to a touch interface configured to perform heat control and selection of the plurality of hobs 12 as illustrated in a plurality of instructive decals 26 disposed on a cooking surface 28 of the cooktop 10. The user interface 22 may comprise a plurality of input detection sensors 30 configured to detect a presence of an object, for example, a finger of an operator, proximate thereto. The input detection sensors 30 may correspond to any form of sensors. In an exemplary embodiment, the input detection sensors 30 may correspond to capacitive, resistive, and/or optical sensors. In an exemplary embodiment, the input detection sensors 30 correspond to capacitive proximity sensors.

The user interface 22 may further comprise a display 32 configured to communicate at least one function of the cooktop 10. The display 32 may correspond to various forms of displays, for example, a light emitting diode (LED) display, a liquid crystal display (LCD), etc. In some embodiments, the display 32 may correspond to a segmented display configured to depict one or more alpha-numeric characters to communicate a cooking function of the cooktop 10. The display 32 may further be operable to communicate one or more error messages or status messages of the cooktop 10. Though the exemplary embodiment of the inventive subject matter discussed herein is provided in reference to an induction cooktop, the sensor support apparatus may be implemented in a variety of cooking appliances without departing from the spirit of the disclosure.

Figure 2:
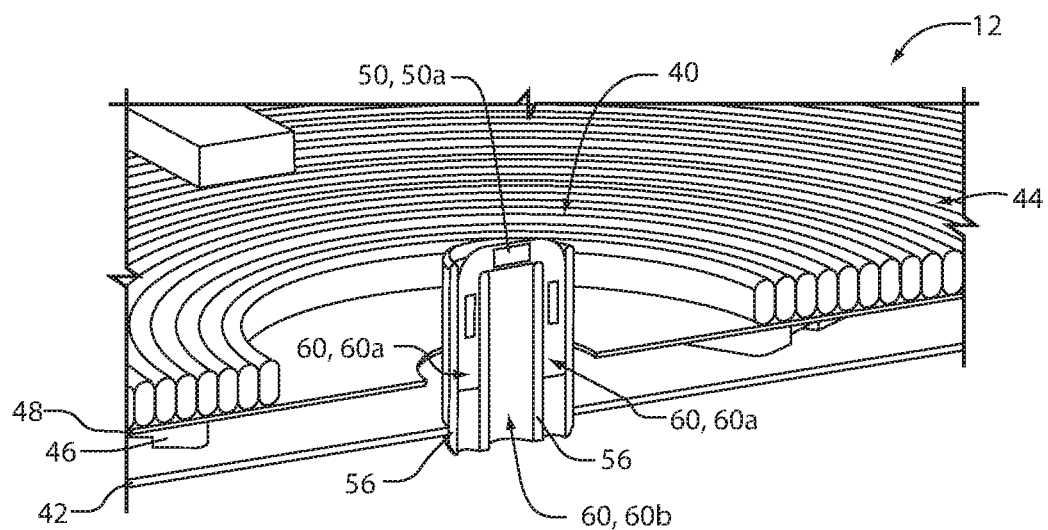
FIG. 2 is a projected side cross-sectional view of an induction coil of a cooktop demonstrating a sensor support apparatus.
Figure 3:
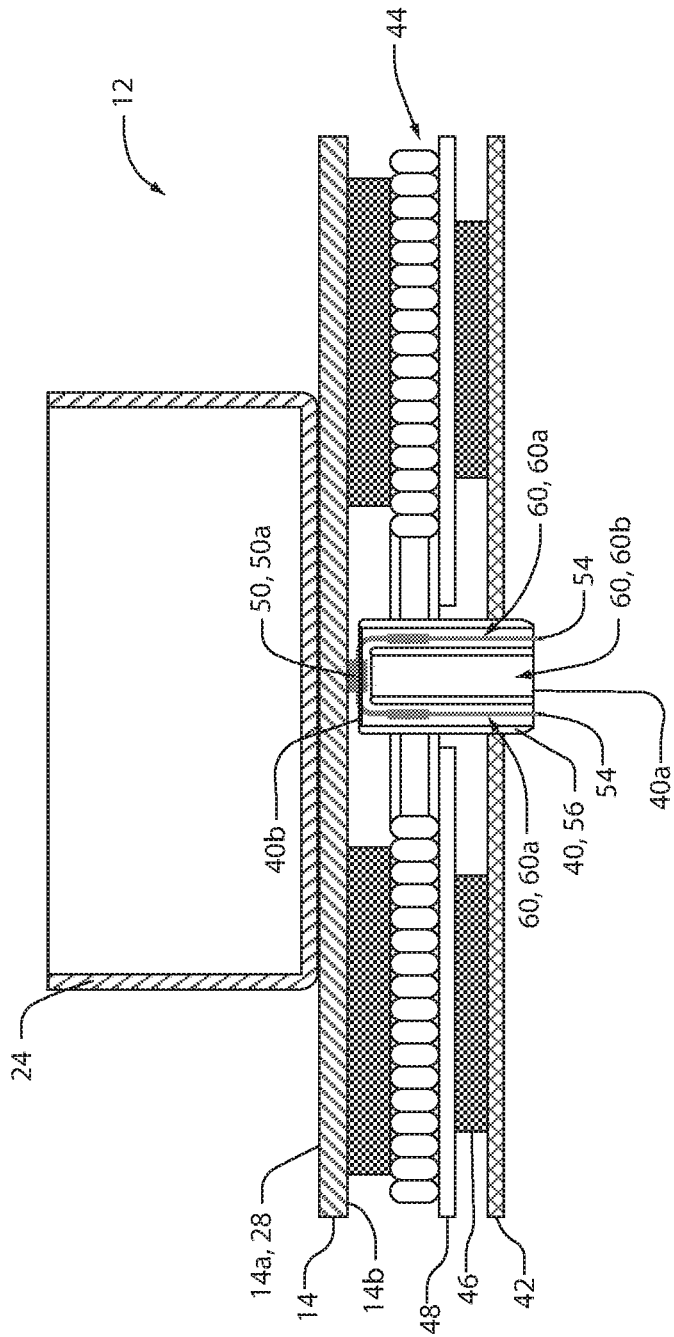
FIG. 3 is a side, cross-sectional schematic view of an induction coil of a cooktop demonstrating a sensor support.

FIG. 2 demonstrates a projected side cross-sectional view of a hob 12 (e.g. an induction coil assembly) of the cooktop 10 demonstrating a sensor support 40 in accordance with the disclosure. FIG. 3 is a side, cross-sectional schematic view of an induction coil 44 demonstrated in FIG. 2. Referring now to FIGS. 1-3, the hob 12 of the cooktop 10, or more generally a heating apparatus, illustrates a cross-sectional view of the surface panel 14 demonstrating an outside surface 14a that corresponds to the cooking surface 28 and an interior surface 14b. As shown in FIG. 3, the vessel 24 is positioned on the outside surface 14a above the hob 12.

In an exemplary embodiment, a housing may form an enclosure (not shown) around the elements shown in FIGS. 2 and 3. Within the enclosure each of the hobs 12 may be supported by a base plate 42. The hob 12 may be formed by the induction coil 44, which may be separate from a magnet member 46 by a foil 48. In this configuration, the induction coil 44 may be supported in a stacked configuration, which may correspond to a pancake coil configuration of an induction cooktop. As discussed herein, a temperature sensor 50 is shown positioned within the cooktop housing by a sensor support 40. Though demonstrated as being incorporated within the hob 12, the temperature sensor 50 and support may be positioned in various locations in the cooktop 10. In this way, the temperature sensor may be positioned and retained in thermally conductive contact with the interior surface 14b of the panel 14 by the sensor support 40. Accordingly, the temperature sensor 50 may be in communication with the controller 20 such that the controller 20 may monitor the temperature of the panel 14.

In some embodiments, primary function of the temperature sensor 50 may be detecting the temperature of cookware heated on the cooking surface 28 to avoid over-temperature events and to regulate or keep constant oil temperature during frying. Accordingly, the temperature sensor 50 may be in electrical connection with the controller 20 via at least one conductive connector 54. In this configuration, the controller 20 may be operable to adjust the power supplied to the hob 12 based on the temperature identified by the temperature sensor 50. In an exemplary embodiment, the temperature sensor 50 is housed in the support 40, which is configured to maintain the temperature sensor 50 in contact with a glass material forming the surface panel 14 of the cooktop 10.

In various embodiments, the sensor support 40 may be mechanically secured to the base plate 42 of the hob 12, which may also be configured to support the assembly of the induction coil 44 as shown. In general, the sensor support 40 may be configured to position the sensor 50 between the base plate 42 and the cooking surface 28. The sensor support 40 may be formed of a continuous, rigid or semi-rigid material forming a support body 56 comprising a holder base surface 40a and a holder top surface 40b. A plurality of interior passages 60 may be formed through the support body 56 to accommodate the at least one conductive connector 54 of the temperature sensor 50 in the first configuration 50a and the second configuration 50b as discussed herein. Additionally, the support body 56 may form or otherwise incorporate at least one attachment feature configured to engage the base plate 42, the foil pancake element 48, and/or other joining fixtures with plastic frames and support the support body 56 extending through a portion of an interior volume formed by the housing 18 of the cooktop 10.

As depicted in FIGS. 3 and 4, the temperature sensor 50 is shown in a first configuration. The first configuration 50a may be an axial temperature sensor having a first topography. As demonstrated in FIG. 5, a second configuration 50b of the temperature sensor 50 may comprise a probe-type temperature sensor having a second topography. The identifying terms first, second, third, etc., are utilized consistently throughout the detailed description to ensure that the disclosure may provide a clear understanding to persons skilled in the art. However, these identifying terms may only distinguish between or among various elements in the claims, which may not correspond to the same topographies specified in the specification unless recited as such in the appended claims. Accordingly, the identifying terms provided to accurately reference various elements in the detailed description. However, these terms shall not be considered limiting to the claims.

FIGS. 4A and 4B demonstrate a projected view and a cross-sectional view of the sensor support 40 with the temperature sensor 50 in the first configuration 50a. FIGS. 5A, 5B, and 5C demonstrate a projected view and cross-sectional views of the sensor support 40 with the temperature sensor 50 in the second configuration 50b. The first configuration 50a may be an axial temperature sensor having a sensor body 68, which may be elongated and configured to extend along a longitudinal axis parallel to the panel 14. In various embodiments, the first configuration 50a may comprise a first conductive connector 54a extending from the sensor body 68 at a first end portion 68a and a second conductive connector 54b extending from the sensor body 68 at a second end portion 68b. The first end portion 68a may be oriented on a generally opposing side of the sensor body 68 from the second end portion 68b such that the sensor 50 in the first configuration 50a extends linearly along the holder top surface 40b.

The second configuration 50b may comprise a probe-type temperature sensor comprising a probe tip 70 configured to be in thermally conductive connection with the panel 14 by contacting a proximate surface with the probe tip 70. The probe tip 70 may be formed by a variety of shapes (e.g. rounded, cylindrical, rectangular, etc.) but may generally comprise the at least one conductive connector 54 extending from a connection portion 70a oriented generally opposite to a terminal end portion 70b of the probe tip 70. In this configuration, a third conductive connector 54c and a fourth conductive connector 54d may extend from the connection portion 70a of the probe tip 70 in parallel and away from the terminal end portion 70b.

In order to accommodate the temperature sensor 50 in each of the configurations 50a, 50b; the plurality of interior passages 60 may comprise at least a first interior passage 60a configured to receive the sensor 50 the first configuration 50a. The interior passages 60 may further comprise a second interior passage 60b configured to receive the sensor in the second configuration 50b. The first interior passage 60a may comprise a plurality of first interior passages 60a, which may be referred to as a first conductor passage 76 and a second conductor passage 78. The first conductor passage 76 and the second conductor passage 78 may be separate from the second interior passage 60b. In an exemplary embodiment, the first conductor passage 76 and the second conductor passage 78 may be offset from the second interior passage 60b, which may extend centrally through the support body 56 from the holder base surface 40a to the holder top surface 40b. In this configuration, the first conductor passage 76 and the second conductor passage 78 may extend closer to a perimeter or exterior profile surface 40c of sensor support 40.

Referring now to FIGS. 4A and 4B, the sensor support 40 is shown in combination with the temperature sensor 50 in the first configuration 50a. In order to accommodate the first configuration 50a, the first conductor passage 76 and the second conductor passage 78 may be spaced from each other at least a length of the sensor body 68. In general, each of the interior passages 60 may extend substantially parallel to each other. In some embodiments, the support body 56 may be formed of an electrically insulating material configured to isolate the first conductor passage 76 from the second conductor passage 78. In this configuration, if the conductive connectors 54 of the sensor 50 are not insulated, the support body 56 may provide for electrical insulation therebetween.

In addition to the conductor passages 76 and 78, a trough 80 may be formed in the holder top surface 40b. The trough may extend from the first conductor passage 76 to the second conductor passage 78 to seat and support the sensor body 68. In this way, the sensor support 40 may retain the sensor body 68 in thermally conductive connection with the interior surface 14b. In various embodiments, the trough 80 may comprise a cross-sectional shape (e.g. a semicircle, rectangle, etc.) configured to complement the profile of the sensor body 68. In this configuration, the sensor support 40 may be configured to secure the sensor 50 in thermally conductive contact with the panel 14 in the first configuration 50a.

Referring now to FIGS. 5A, 5B, and 5C, the sensor support 40 is shown in combination with the temperature sensor 50 in the second configuration 50b. In order to accommodate the second configuration 50b, the second interior passage 60b may extend centrally through the support body 68. In this configuration, the sensor support 40 may be configured to receive the temperature sensor 50 in the second configuration 50b extending through the second interior passage 60b between the conductor passages 76 and 78. In this way, the disclosure may provide for the temperature sensor 50 in each of the configurations 50a, 50b to be interchangeably utilized without changing the sensor support 40 or the assemblies of the cooktop 10 in connection with or otherwise interacting with the sensor support 40.

In some embodiments, the sensor holder may further comprise a top plate 82 configured to be disposed between the interior surface 14b of the panel 14 and the sensor 50. The top plate 82 may be of a thermally conductive material (e.g. metallic, conductive polymer, etc.) and comprise significantly flat top surface 82a. The top surface 82a may be configured to conductively contact the interior surface 14b of the panel 14. The top plate 82 may further comprise a conduit portion 82b extending from a bottom surface 82c of the top plate 82. The conduit portion 82b may be configured to form a pocket or cavity configured to receive the probe tip 70 of the temperature sensor 50 in the second configuration 50b. The conduit portion 82b may form an exterior mating profile configured to complement and engage an interior mating profile of the second interior passage 60b. In this configuration, the conduit portion 82b of the top plate 82 may be configured to slideably engage the second interior passage 60b and secure the temperature sensor 50 in the second configuration 50b in thermally conductive connection with the surface panel 14.

Referring to FIGS. 4A, 5A, and 5C; the at least one attachment feature 84 is shown. As previously discussed, the support body 56 may form or otherwise incorporate the at least one attachment feature 84 configured to engage the base plate 42 and support the support body 56 extending through a portion an interior volume formed by the housing 18 of the cooktop 10. As demonstrated, the attachment feature 84 may comprise at least one notch 86, configured to engage the base plate 42 of the cooktop 10, extending into the support body 56 from the exterior profile surface 40c. In other design solutions, support body 56 can have two notches 86a and 86b that may engage one or more occluded portions of an aperture formed through the base plate 42, the foil 48, and/or various features to affix the sensor support 40 and the temperature sensor 50 in either the first configuration 50a or the second configuration 50b in to the cooktop 10 in thermally conductive connection with the surface panel 14.

In various examples, the disclosure may provide for any of the following configurations, which may be combined as would be understood by those skilled in the art without departing from the spirit of the disclosure.

In some implementations, the disclosure may provide for a sensor holder apparatus for a cooktop comprising: a body forming an exterior profile configured to extend through a portion of a housing of the cooktop and position a sensor proximate to an interior surface of a panel forming a cooking surface; a first interior passage formed through the body configured to receive the sensor in a first configuration; and at least one second interior passage configured to receive the sensor in a second configuration, wherein the sensor holder is configured to retain and position the sensor in the first configuration or the second configuration.

In some implementations, the sensor holder apparatus may comprise one or more of the follow features or aspects:
- each of the interior passages is configured to extend through the body substantially from a holder base surface to a holder top surface;
- the at least one second interior passage comprises a first conductor passage and a second conductor passage, wherein a trough is formed in the holder top surface extending from the first conductor passage to the second conductor passage;
- the first interior passage is formed centrally though the body;
- the sensor comprises a temperature sensor;
- the first configuration and the second configuration comprise different sensor topographies;
- the apparatus is configured to position the sensor in conductive contact with a panel forming a cooking surface of the cooktop;
- the cooktop comprises a heating coil supported by a base plate, wherein the sensor holder is configured to position the sensor between the base plate and the cooking surface;
- the body comprises at least one attachment feature configured to engage the base plate and support the body extending through a portion of an interior volume formed by the housing of the cooktop;
- the attachment feature comprises at least one notch extending into the body from the exterior profile; and/or
- the at least one notch comprises a first notch and a second notch arranged on opposing sides of the body, and wherein each of the first notch and the second notch are configured to engage the base plate of the cooktop.

The disclosure may also provide for a method for positioning a plurality of temperature sensors in a cooktop housing, the method comprising: positioning a temperature sensor probe in a housing of the cooktop with a sensor support; connecting the temperature sensor probe via a thermally conductive connection to an interior surface of a panel of a cooking surface; and interchangeably supporting the temperature sensor probe in a plurality of configurations comprising: a first configuration forming a single passage through a body of the sensor support; and a second configuration forming a looping passage through the body of the sensor support, wherein the looping passage comprises a plurality of electrically isolated passages extending through the body. In various implementations, the first configuration comprises a probe-type temperature sensor comprising at least one electrically insulated conductive connector and the second configuration comprises a plurality of perimeter passages configured to receive conductive connections of an axial temperature sensor.

In various implementations, the disclosure may further provide for a sensor holder apparatus for a cooktop configured to position the sensor in conductive connection with a panel forming a cooking surface of the cooktop, the apparatus comprising: a body forming an exterior profile extending between a holder base surface to a holder top surface; and a plurality of interior passages extend through the body substantially from the holder base to the top surface, wherein a first interior passage is configured to receive the sensor in a first configuration and at least a second interior passage is configured to receive the sensor in a second configuration, wherein the first configuration and the second configuration comprise different topographies of the sensor.

In some implementations, the sensor holder apparatus may comprise one or more of the follow features or aspects:
- a top plate configured to be disposed between the interior surface of the panel and the sensor;
- the top plate forms a significantly flat top surface configured to receive the sensor in the first configuration and conductively contact the interior surface of the panel;
- the top plate further comprises a conduit extending from a bottom surface of the top plate, wherein the conduit forms an exterior mating profile configured to engage an interior mating profile of the first interior passage;
- the at least one second interior passage comprises a first conductor passage and a second conductor passage, wherein each of the conductor passages is configured to receive a conductive connector of the sensor in the second configuration;
- the body of the sensor holder isolates the first conductor passage and the second conductor passage such that electricity is not conducted therebetween; and/or
- the first conductor passage and the second conductor passage extend substantially parallel to the first interior passage through the body separate from and offset axially outward from a center of the body.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, notches numbers, joining couplings and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A sensor holder apparatus for a cooktop comprising:
a body forming an exterior profile configured to extend through a portion of a housing of the cooktop and position a sensor adjacent to an interior surface of a panel forming a cooking surface;
a first interior passage formed through the body configured to receive the sensor in a first configuration; and
at least one second interior passage formed through the body configured to receive the sensor in a second configuration, wherein the sensor holder apparatus is configured to retain and position the sensor in the first configuration or the second configuration,
wherein each of the interior passages extends through the body from a holder base surface to a holder top surface,
wherein the at least one second interior passage comprises a first conductor passage and a second conductor passage, wherein a trough is formed in the holder top surface extending from the first conductor passage to the second conductor passage.

2. The sensor holder apparatus according to claim 1, wherein the first interior passage is formed centrally though the body.

3. The sensor holder apparatus according to claim 1, wherein the sensor comprises a temperature sensor.

4. The sensor holder apparatus according to claim 1, wherein the first configuration and the second configuration comprise different sensor topographies.

5. The sensor holder apparatus according to claim 1, wherein the apparatus is configured to position the sensor in conductive contact with a panel forming the cooking surface of the cooktop.

6. The sensor holder apparatus according to claim 1, wherein the cooktop comprises a heating coil supported by a base plate, wherein the sensor holder is configured to position the sensor between the base plate and the cooking surface.

7. The sensor holder apparatus according to claim 6, wherein the body comprises at least one attachment feature configured to engage the base plate and support the body extending through a portion of an interior volume formed by the housing of the cooktop.

8. The sensor holder apparatus according to claim 7, wherein the attachment feature comprises at least one notch extending into the body from the exterior profile.

9. The sensor holder apparatus according to claim 8, wherein at least one notch comprises a first notch and a second notch arranged on opposing sides of the body, and wherein each of the first notch and the second notch are configured to engage the base plate of the cooktop.

10. A sensor holder apparatus for a cooktop comprising:
a body comprising a holder base surface and a holder top surface, the body forming an exterior profile configured to extend through a portion of a housing of the cooktop and position a sensor adjacent to an interior surface of a panel forming a cooking surface;
a first interior passage formed through the body configured to receive the sensor in a first configuration; and
at least one second interior passage formed through the body, the second interior passage configured to receive the sensor in a second configuration; and
a trough formed in the holder top surface extending from the at least one second interior passage, wherein the sensor holder apparatus is configured to retain and position the sensor in the first configuration in the first interior passage or the second configuration in the trough.

11. The sensor holder apparatus according to claim 10, wherein each of the interior passages extends through the body from a holder base surface to a holder top surface.

12. The sensor holder apparatus according to claim 11, wherein the at least one second interior passage comprises a first conductor passage and a second conductor passage, wherein the trough extends between the first conductor passage and the second conductor passage.

13. A sensor holder apparatus for a cooktop comprising:
a body comprising holder base surface to a holder top surface, the body forming an exterior profile configured to extend through a portion of a housing of the cooktop and position a sensor adjacent to an interior surface of a panel forming a cooking surface;
a first interior passage formed through the body configured to receive the sensor in a first configuration; and
at least one second interior passage configured to receive the sensor in a second configuration and comprising a first conductor passage and a second conductor passage, wherein a trough is formed in the holder top surface extending from the first conductor passage to the second conductor passage.

* * * * *